(12) United States Patent
Liang et al.

(10) Patent No.: US 8,199,492 B2
(45) Date of Patent: Jun. 12, 2012

(54) ACCESSORY STRAP FIXING STRUCTURE

(75) Inventors: Hua-Xiang Liang, Shenzhen (CN); Jun Wang, Shenzhen (CN); Hsiao-Hua Tu, Taipei (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 394 days.

(21) Appl. No.: 12/557,705

(22) Filed: Sep. 11, 2009

(65) Prior Publication Data

US 2010/0226078 A1 Sep. 9, 2010

(30) Foreign Application Priority Data

Mar. 9, 2009 (CN) .......................... 2009 1 0300757

(51) Int. Cl.
*G06F 1/16* (2006.01)

(52) U.S. Cl. .............. 361/679.56; 361/679.58; 294/149; 294/150; 242/164; 242/165; 242/170; 242/171

(58) Field of Classification Search ............. 361/679.56; 396/415
See application file for complete search history.

(56) References Cited

U.S. PATENT DOCUMENTS

| 4,058,242 | A | * | 11/1977 | Brewer ......................... 224/606 |
| 4,348,095 | A | * | 9/1982 | Suzuki et al. ................. 396/539 |
| 5,724,667 | A | * | 3/1998 | Furuno ....................... 455/575.2 |
| 6,164,582 | A | * | 12/2000 | Vara ............................... 242/395 |
| 6,182,169 | B1 | * | 1/2001 | Force et al. ..................... 710/62 |
| 6,290,156 | B1 | * | 9/2001 | Jeffrey ........................... 242/171 |
| 6,731,956 | B2 | * | 5/2004 | Hanna et al. ............... 455/569.1 |
| 7,403,117 | B2 | * | 7/2008 | Leyden et al. .............. 340/568.2 |
| 7,524,309 | B2 | * | 4/2009 | McConnell et al. .......... 604/264 |
| 7,649,732 | B2 | * | 1/2010 | Yang et al. ............... 361/679.01 |
| 7,929,297 | B2 | * | 4/2011 | Chen ....................... 361/679.56 |
| 2002/0126217 | A1 | * | 9/2002 | Arakane et al. ............... 348/375 |
| 2005/0242223 | A1 | * | 11/2005 | Woodward ..................... 242/376 |
| 2007/0108333 | A1 | * | 5/2007 | Kuramoto ..................... 242/395 |
| 2008/0219657 | A1 | * | 9/2008 | Suzuki et al. ................. 396/423 |

* cited by examiner

*Primary Examiner* — Anthony Q Edwards

(74) *Attorney, Agent, or Firm* — Altis Law Group, Inc.

(57) ABSTRACT

An accessory strap fixing structure is positioned on a portable electronic device to assemble an accessory strap. The accessory strap fixing structure includes an assembling space and a rotary element. The assembling space defined in the portable electronic device. The rotary element is rotatably assembled within the assembling space. The rotary element forms a projection for attaching an end of the accessory strap to allow the accessory strap to pass through the assembling space. The invention also discloses a portable electronic device having the accessory strap fixing structure.

9 Claims, 4 Drawing Sheets

ACCESSORY STRAP FIXING STRUCTURE

BACKGROUND

1. Technical Field

The present disclosure generally relates to an accessory strap fixing structure and a portable electronic device having the same.

2. Description of Related Art

With the development of technologies, portable electronic devices such as mobile phones, MP3s, digital cameras and personal digital assistants (PDAs) are now in widespread use, and consumers may now enjoy the full convenience of high technology products almost anytime and anywhere.

The conventional portable electronic device usually has an accessory strap fixing structure disposed thereon to assemble the accessory strap. However, the dimension of the existing accessory strap fixing structure makes it difficult for the accessory strap to be assembled thereon.

Therefore, there is room for improvement within the art.

BRIEF DESCRIPTION OF THE DRAWINGS

Many aspects of the present accessory strap fixing structure and portable electronic device having the same can be better understood with reference to the following drawings. The components in the drawings are not necessarily drawn to scale, the emphasis instead being placed upon clearly illustrating the principles of the present accessory strap fixing structure and portable electronic device having the same. Moreover, in the drawings, like reference numerals designate corresponding parts throughout the several views.

DETAILED DESCRIPTION

Figure 1:
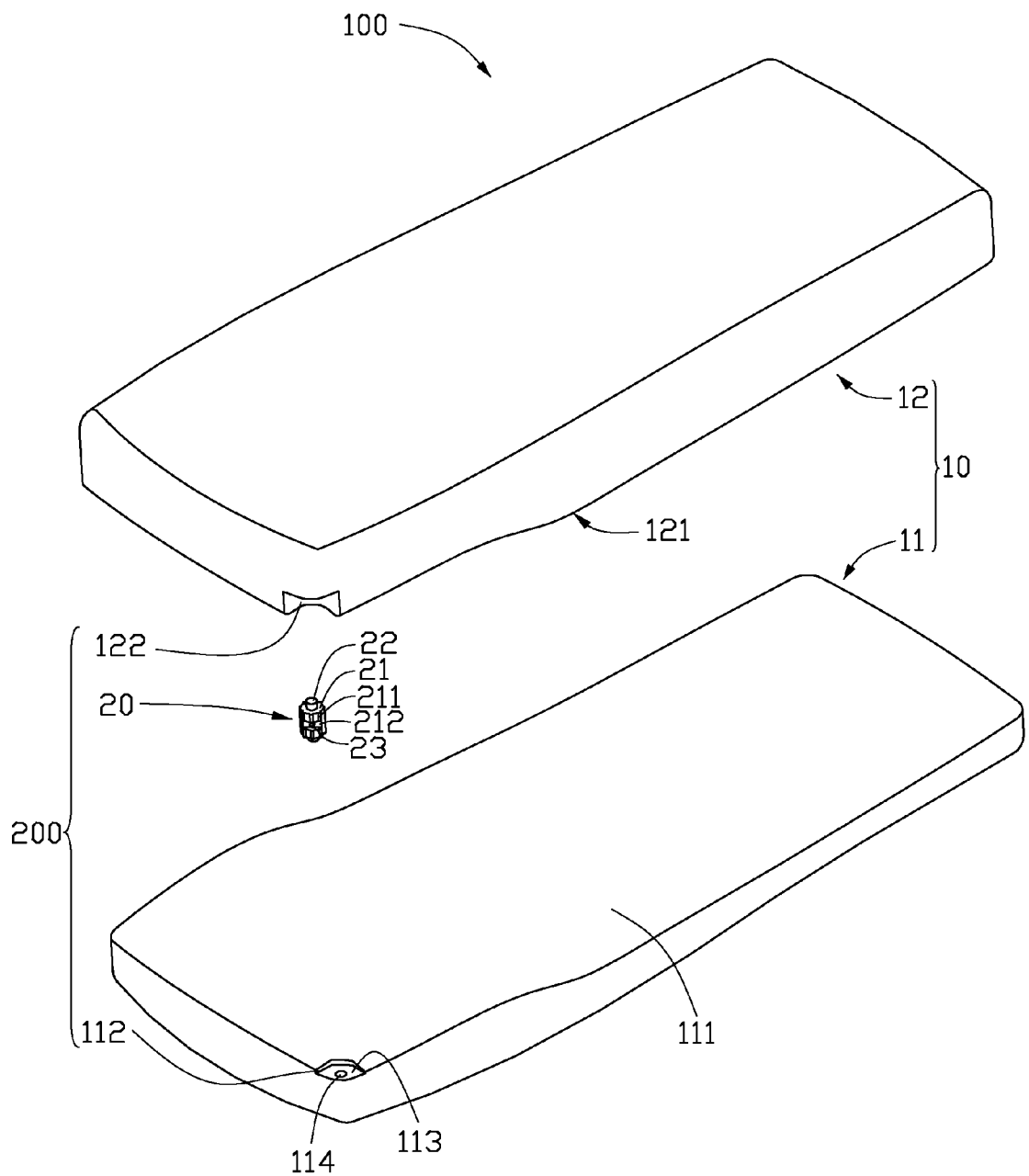
FIG. 1 shows an exploded, isometric view of the portable electronic device in accordance with an exemplary embodiment.
Figure 2:
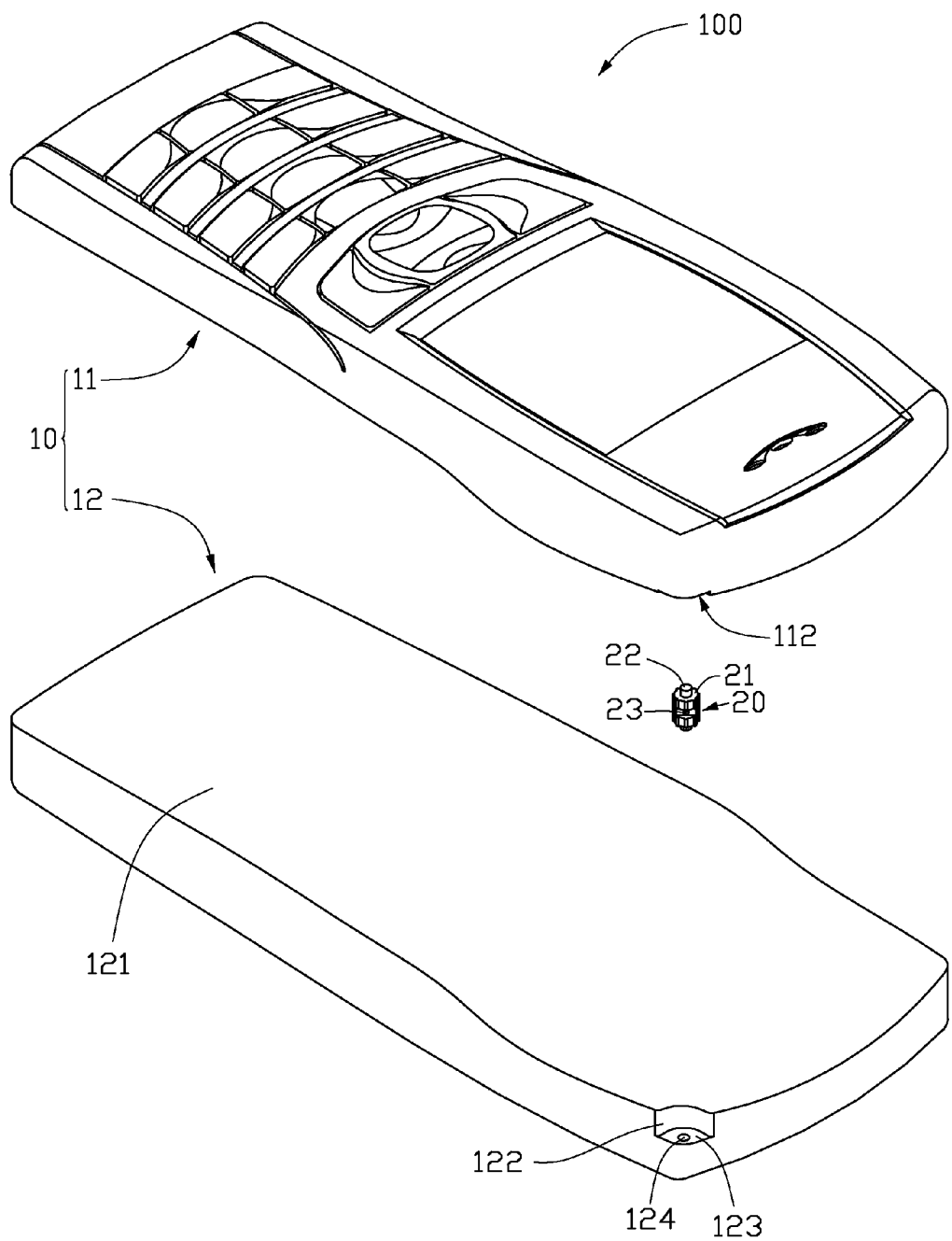
FIG. 2 is similar to FIG. 2, but viewed from another aspect.

Referring to FIGS. 1 and 2, a portable electronic device 100 includes a main body 10 and an accessory strap fixing structure 200 positioned thereon to assemble an accessory strap 30 thereof. The main body 10 may be a mobile phone, an MP3, a digital camera or a personal digital assistant (PDA), etc. The accessory strap fixing structure 200 includes an assembling space 15 (FIG. 3) defined by the main body 10 and a rotary element 20 rotatably assembled within the assembling space 15.

In the exemplary embodiment, the main body 10 includes an upper housing 11 and a lower housing 12. The upper housing 11 includes a first surface 111. The first surface 111 has a first assembling area 112 recessed thereon adjacent to one corner thereof. The first assembling area 112 includes an assembling bottom wall 113. The assembling bottom wall 113 has a first hole 114 defined for receiving the rotary element 20.

The lower housing 12 is detachably assembled with the upper housing 11. The lower housing 12 includes a second surface 121 and a bottom wall 123. The second surface 121 defines a second assembling area 122 adjacent to one corner thereof and corresponding to the first assembling area 112 of the upper housing 11. The bottom wall 123 of the second assembling area 122 defines a second hole 124 corresponding to the first hole 114. The first assembling area 112 is engagable with the second assembling area 122 to form the assembling space 15.

Figure 4:
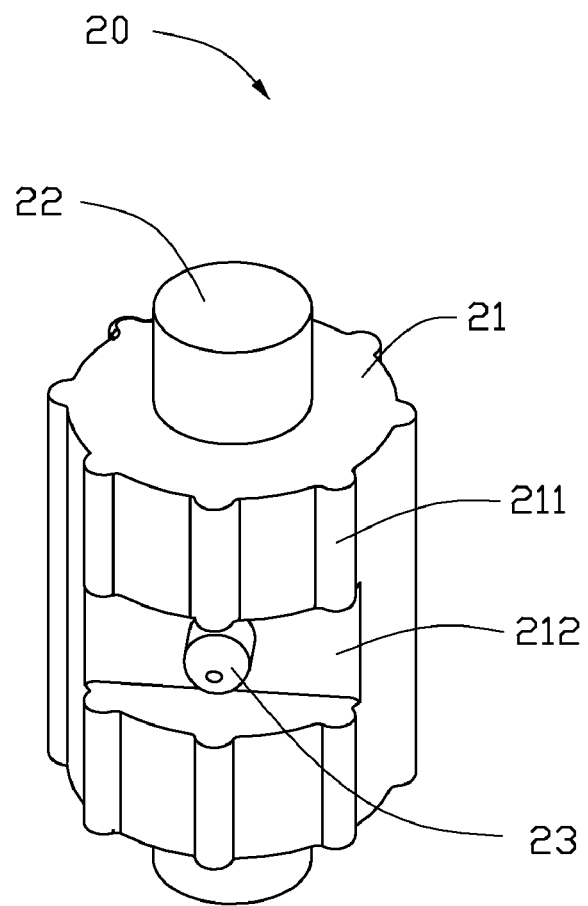
FIG. 4 is an enlarged view of a rotary element shown in FIG. 2.

Referring to FIG. 4, the rotary element 20 may be received in the assembling space 15. The rotary element 20 includes a body 21. The body 21 is substantially cylindrical, and includes a plurality of ribs 211 spaced apart disposed at the outer peripheral wall thereof. The body 21 defines a rectangular notch 212 at a middle area of one side thereof. A projection 23 perpendicularly protrudes from a middle area of a bottom wall of the notch 212. Two pins 22 respectively protrude from two ends of the body 21 for being rotatably received in the first hole 114 and the second hole 124.

Figure 3:
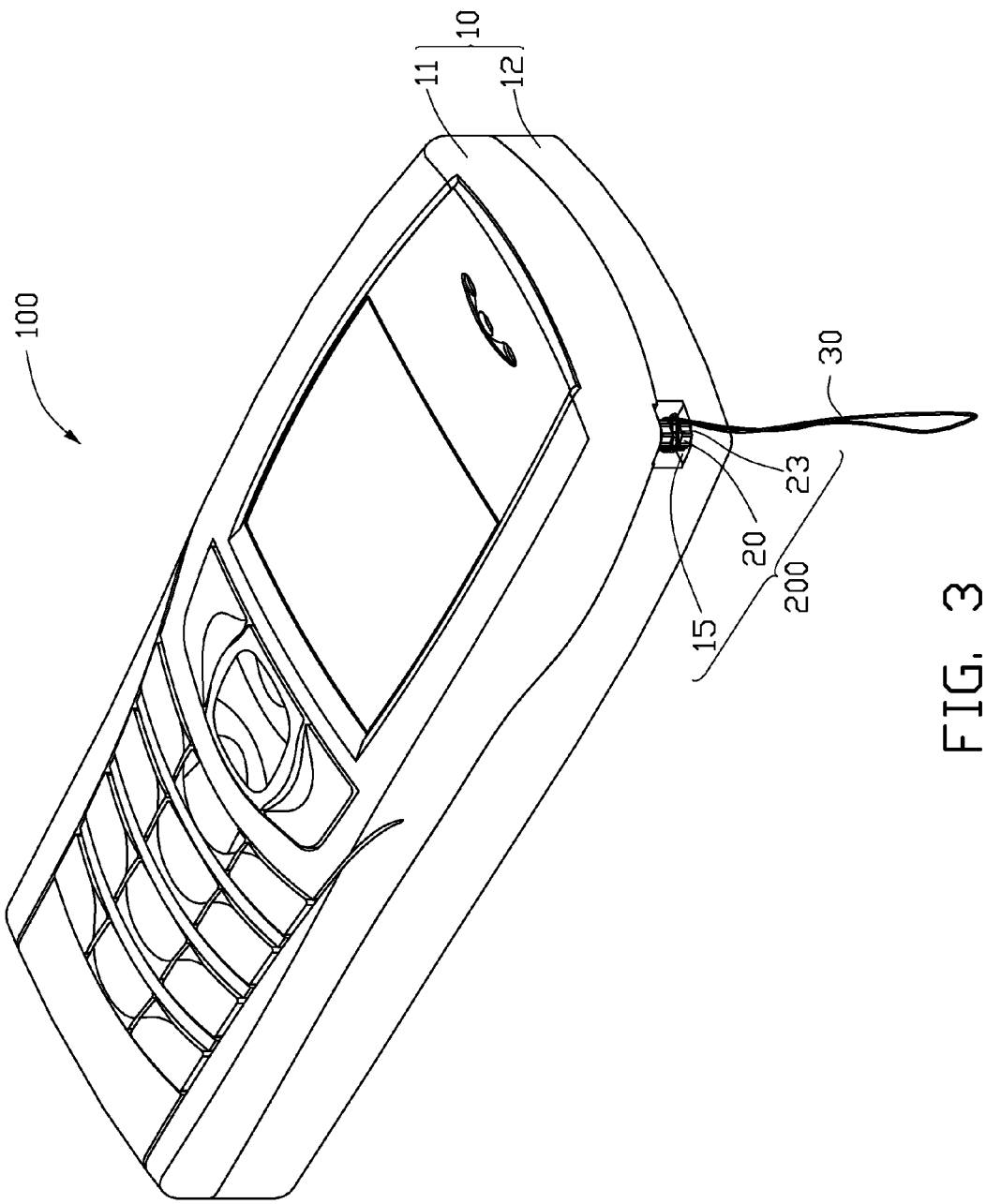
FIG. 3 shows an assembled view of a portable electronic device having an accessory strap assembled therewith shown in FIG. 2.

In assembly, referring to FIG. 3, firstly, one pin 22 of the rotary element 20 is rotatably positioned in the second hole 124 of the lower housing 12. Then, the upper housing 11 is mounted to the lower housing 12, the first assembling area 112 of the upper housing 11 and the second assembling area 122 of the lower housing 12 cooperatively form the assembling space 15 to accommodate the rotary element 20. The other pin 22 is rotatably positioned in the first hole 114 of the upper housing 11. The rotary element 20 is spaced from the assembling space 15 so as to provide an opening space for assembling the accessory strap 30.

When assembling the accessory strap 30, one end of the accessory strap 30 is attached to the projection 23 of the rotary element 20, and can rotate relative to the mobile phone 100 by external forces such as fingers of users. The accessory strap 30 contacts with the peripheral wall of the rotary element 2, and enters from one end of the opening space. Then, the rotary element 20 rotates to assist the accessory strap 30 to penetrate through the assembling space 15 and be exposed from the other end of the opening space. It is easy to operate and assemble the accessory strap 30 quickly and conveniently.

It is to be understood, however, that even though numerous characteristics and advantages of the present invention have been set forth in the foregoing description, with details of the structure and function of the present invention, the disclosure is illustrative only, and changes may be made in detail, especially in matters of shape, size, and arrangement of parts within the principles of present invention to the full extent indicated by the broad general meaning of the terms in which the appended claims are expressed.

What is claimed is:

1. An accessory strap fixing structure positioned on a portable electronic device to assemble an accessory strap thereon, the accessory strap fixing structure comprising:
   an assembling space defined in the portable electronic device; and
   a rotary element rotatably assembled within the assembling space, the rotary element having a circumferential outer peripheral wall spaced from the assembling space to provide an opening space;
   wherein the rotary element forms a projection for attaching an end of the accessory strap, a portion of the accessory strap coiled around the circumferential outer peripheral wall of the rotary element through the opening space to allow another end of the accessory strap to be exposed from the opening space and the assembling space.

2. The accessory strap fixing structure as claimed in claim 1, wherein the rotary element includes two pins, the portable electronic device defines a first hole and a second hole, and the two pins of the rotary element are rotatably assembled in the first hole and the second hole.

3. The accessory strap fixing structure as claimed in claim 1, wherein the rotary element forms a plurality of ribs spaced apart positioned at the circumferential outer peripheral wall thereof.

4. The accessory strap fixing structure as claimed in claim 1, wherein the rotary element defines a notch with a bottom wall, and the projection extends from the bottom wall of the notch.

5. The accessory strap fixing structure as claimed in claim 1, wherein the portable electronic device includes an upper housing and the lower housing, and the assembling space is defined adjacent to a corner of the portable electronic device.

6. A portable electronic device comprising:
   a main body defining an assembling space, a first hole and a second hole, the assembling space communicates with the first hole and the second hole; and
   an accessory strap fixing structure positioned on the main body to assemble an accessory strap; the accessory strap fixing structure comprising:
   a rotary element rotatably assembled within the assembling space, the rotary element including two pins, the two pins of the rotary element rotatably assembled in the first hole and the second hole;
   wherein the rotary element forms a projection for attaching an end of the accessory strap to allow the accessory strap to pass through the assembling space.

7. The portable electronic device as claimed in claim 6, wherein the rotary element forms a plurality of ribs spaced apart disposed at the peripheral wall thereof.

8. The portable electronic device as claimed in claim 6, wherein the rotary element defines a notch with a bottom wall, and the projection extends from the bottom wall of the notch.

9. The portable electronic device as claimed in claim 6, wherein the main body includes an upper housing and the lower housing, the assembling space is defined adjacent to a corner of the main body.

* * * * *